United States Patent
Illsley

(10) Patent No.: US 7,697,787 B2
(45) Date of Patent: Apr. 13, 2010

(54) DYNAMIC REPLACEMENT OF THE FACE OF AN ACTOR IN A VIDEO MOVIE

(75) Inventor: Martin Illsley, Magagnosc (FR)

(73) Assignee: Accenture Global Services GmbH, Schaffhausen (CH)

( * ) Notice: Subject to any disclaimer, the term of this patent is extended or adjusted under 35 U.S.C. 154(b) by 1537 days.

(21) Appl. No.: 10/456,765

(22) Filed: Jun. 6, 2003

(65) Prior Publication Data

US 2003/0228135 A1    Dec. 11, 2003

(30) Foreign Application Priority Data

Jun. 6, 2002    (EP)    ................... 02354093

(51) Int. Cl.
*G06K 9/32*  (2006.01)
*G06K 9/36*  (2006.01)
*G06K 9/00*  (2006.01)
*G11B 27/00*  (2006.01)
*H04N 5/00*  (2006.01)

(52) U.S. Cl. ...................... 382/295; 382/276; 382/285; 382/289; 382/118; 386/52; 386/117

(58) Field of Classification Search .................. 382/295
See application file for complete search history.

(56) References Cited

U.S. PATENT DOCUMENTS 5,566,251 A * 10/1996 Hanna et al. ................. 382/284
5,830,065 A * 11/1998 Sitrick .......................... 463/31
6,115,052 A * 9/2000 Freeman et al. ............. 345/473
6,141,060 A * 10/2000 Honey et al. ................ 348/578
6,144,755 A * 11/2000 Niyogi et al. ............... 382/118

(Continued)

FOREIGN PATENT DOCUMENTS

EP    0 664 526 A2    7/1995

(Continued)

OTHER PUBLICATIONS

European Search Report mailed on Oct. 17, 2003, for EP patent application No. 02354093.3 filed on Jun. 6, 2002, 2 pgs.

(Continued)

*Primary Examiner*—Vikkram Bali
*Assistant Examiner*—Michelle Entezari
(74) *Attorney, Agent, or Firm*—Brinks Hofer Gilson & Lione

(57)    ABSTRACT

The present invention concerns a method for replacing the face of an actor in a video clip, with the one of a user (U) of an entertainment video system (4), consisting in: a preparation phase, taking one first fixed picture of the face of the user; building a 3D-model of that face; replacing a first video picture of the actor with a reproduction of the face of the user; and while the clip is going on, replacing the face of the actor in the successive pictures of the video clip with successive pictures reproducing the face of the user, the transitions of the face of the actor being followed by applying at least orientation, size and displacement vectors to the 3D-model of face of the user on the basis of orientation, size and displacement vectors calculated for the face of the actor in the clip.

12 Claims, 2 Drawing Sheets

U.S. PATENT DOCUMENTS

| | | | |
|---|---|---|---|
| 6,266,452 B1 * | 7/2001 | McGuire | 382/294 |
| 6,283,858 B1 | 9/2001 | Hayes, Jr. et al. | |
| 6,314,197 B1 * | 11/2001 | Jain et al. | 382/125 |
| 6,763,148 B1 * | 7/2004 | Sternberg et al. | 382/293 |
| 6,771,303 B2 * | 8/2004 | Zhang et al. | 348/14.16 |
| 6,807,290 B2 * | 10/2004 | Liu et al. | 382/118 |
| 6,873,724 B2 * | 3/2005 | Brand | 382/154 |
| 7,161,614 B1 * | 1/2007 | Yamashita et al. | 348/42 |
| 2002/0018589 A1 * | 2/2002 | Beuker et al. | 382/132 |
| 2002/0051119 A1 * | 5/2002 | Sherman et al. | 352/1 |
| 2002/0054699 A1 * | 5/2002 | Roesch et al. | 382/131 |
| 2003/0007700 A1 * | 1/2003 | Gutta et al. | 382/282 |
| 2003/0020718 A1 * | 1/2003 | Marshall et al. | 345/474 |

FOREIGN PATENT DOCUMENTS

| | | |
|---|---|---|
| JP | 06110480 | 4/1994 |
| JP | 2001042880 | 2/2001 |

OTHER PUBLICATIONS

Chang Seok Choi et al., "Analysis and Synthesis of Facial Image Sequences in Model-Based Image Coding", IEEE Transactions on Circuits and systems for Video Tech., No. 3, Jun. 4, 1994, pp. 257-275.

* cited by examiner

DYNAMIC REPLACEMENT OF THE FACE OF AN ACTOR IN A VIDEO MOVIE

This application claims the priority benefit of European Patent Application Serial No. 02354093.3, filed Jun. 6, 2002, titled "DYNAMIC REPLACEMENT OF THE FACE OF AN ACTOR IN A VIDEO MOVIE."

FIELD OF THE INVENTION

The present invention relates to an entertainment system in which a user takes the place of a professional actor or singer to play his part.

BACKGROUND

Today, entertainment systems of that kind are limited to replace the voice of a singer or an actor by the voice of the user. Such an entertainment system is known as "karaoke". In a karaoke, the voice of an ordinary person replaces the voice of the singer and is mixed with the music of the corresponding song, and eventually synchronized with a video clip.

A purpose of the invention is to provide a system analogous to the karaoke system, but for a video, that is replacing the face of an actor of a movie or the like with an imitation made by a user.

Another purpose of the invention is to provide a system containing digital clips for movies which are prepared for a replacement of the face of an actor of that movie with the face of a current user or participant taken through a video camera.

There is a technical problem to get the form of a user overlapping in real time the form of the actor that he replaces in the video.

There is another technical problem in updating in real time the face of the actor on the movie with the picture of the user while respecting the orientation of the body of the actor.

Indeed, just replacing the face of an actor in a movie clip with a current picture of the face of a user may not give satisfactory results. For example, the current picture of the user can be a right profile when the actor shows his left one. Then, replacing the faces will lead to a non correspondence between the body of the actor and the face of the user.

According to another purpose, the invention aims at respecting the current face expression of the user imitating the actor, when replacing the face of the actor with the one of the user.

According to that purpose, there is another technical problem in updating in real time the current face of the user even respecting the orientation of the body of the actor.

BRIEF SUMMARY OF THE INVENTION

To attain the above purposes and others, the present invention provides a method and system for dynamically replacing the face of an actor in a video clip with the one of a user. The method comprises the steps of:

in a preparation phase:
taking at least one first fixed picture of the face of the user;
building a 3D-model of that face;
replacing a first video picture of the actor with a reproduction of the face of the user after matching their respective size and orientation; and
while the clip is going on:
replacing the face of the actor in the successive pictures of the video clip with successive pictures reproducing the face of the user, the transitions of the face of the actor in the successive pictures of the video clip being followed by applying at least orientation, size and displacement vectors to the 3D-model of face of the user on the basis of orientation, size and displacement vectors calculated for the face of the actor in the clip.

According to the present invention, the face of the actor to be replaced by the face of the user is pre-recorded and transition parameters (orientation, size, displacement, transformation) are calculated from view to view while the movie clip is going on. Then, the system knows for each transition between two pictures, the vectors of displacement, orientation, size and transformation. According to the invention, the displacement vectors are used to adapt the location of the picture of the user which has to replace the face of the actor in the recorded movie picture. The orientation vectors are used to adapt the orientation of the picture of the user. The size vectors are use to adapt the size modification between the successive pictures.

In practice, all these vectors are combined in transition vectors taking into account one or more of these parameters.

According to a first embodiment, the transformation vectors are used to adapt the deformation of the built 3D-model of the face of the user (taken only on the beginning of the entertainment) in order to respect the transformation (deformation) of the actor face from the preceding picture. According to this first embodiment, only one picture of the user is in principle sufficient. This picture (or preferably some pictures) taken at the beginning of the entertainment, is used to build the 3D-model. Then, the system applies the complete transition vectors of the actor's face to the 3D-model to obtain the right representation of the face of the user to replace the current view of the movie.

According to a second embodiment, the transformation vectors of the face of the actor are used to adapt in real time successive pictures of the face of the user, even if the current picture of the user does not exactly correspond. So, a camera takes successive fixed digital pictures of the user. For example, 50 pictures per second are taken by the camera which is enough for a movie. Here again, the transitions between two pictures (for example, the shape of the mouth, the orientation of the face, the position of the eyes, etc.) are calculated in the form of transition vectors. Then, the built 3D-modelization of the face of the user serves to correct the orientation and size of the current face of the user to correspond to the current orientation and size of the actor face in the movie clip, even respecting the expression of the face of the user (shape of the mouth, the position of the eyes, etc.) performing the imitation.

In both embodiments, only using the transitions between two successive pictures saves calculation time so that the replacement of the faces in the movie clip can be done in real time.

DESCRIPTION OF THE DRAWINGS

These purposes, features and advantages of preferred, non limiting, embodiments of the present invention, will be described by way of examples with reference to the accompanying drawings, of which FIG. 1 schematically represents the main elements of one exemplary embodiment of a system according to the present invention.

Figure 1:
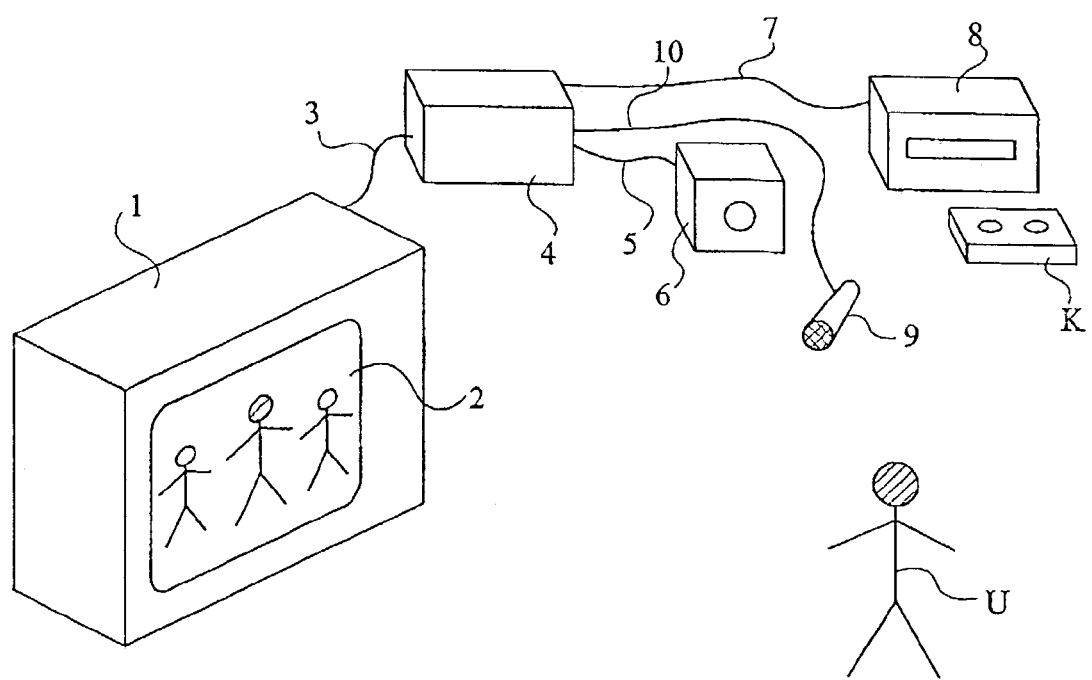
Figure 2:
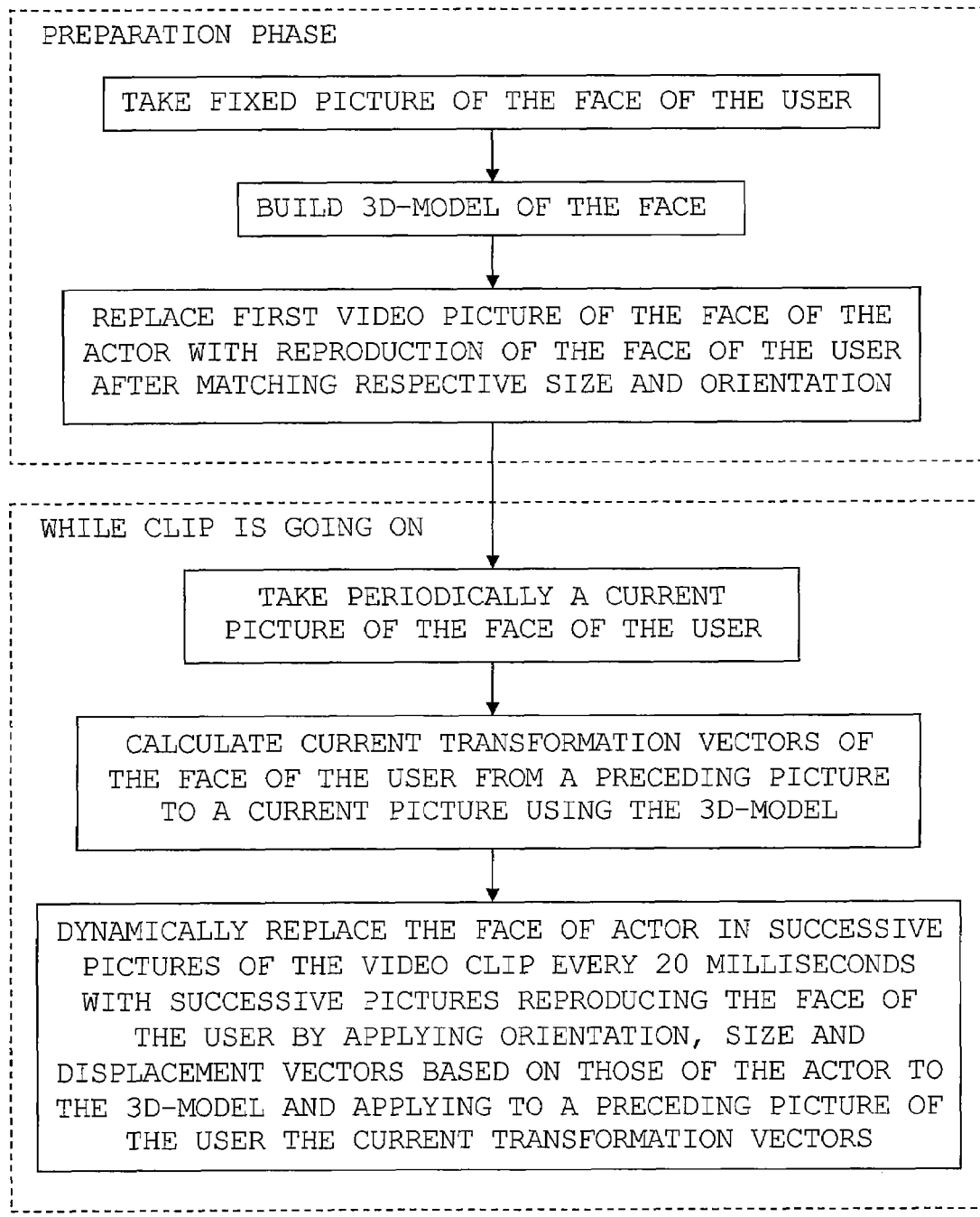
FIG. 2 illustrates one embodiment of the method according to the present invention.

For clarity, only the elements useful to the understanding of the invention have been shown in the drawings and will be disclosed hereafter. Especially, the programming steps according to the system of the invention will not be detailed as it will readily occur to those skilled in the art.

The system comprises a TV set 1 or any video projector (for example, a video retroprojector) on the screen 2 of which is to be displayed a movie clip involving at least one actor the face of which has to be replaced by the face of at least one user U. The TV set 1 communicates through a wired 3 or wireless link with a central processing device 4 of the present invention. The processing device 4 also communicates through a wired 5 or wireless link with a camera 6 for taking fixed pictures of user U. The central processing device 4 communicates through a wired 7 or wireless link with a video reader 8 or the like which is dedicated to read, for example, video cassette K containing the movie clips. Preferably, the movie clips are contained in digital media like a digital video disk (DVD) and the camera 6 is a digital camera which facilitates the processing of the pictures. Alternatively, the camera 6 and/or reader 8 are provided with digital converters.

The system of the present invention also preferably comprises a microphone 9 linked to the central processing device 4 through a wired 10 or wireless link as in a conventional karaoke. Then, the entertainment system according to the present invention can replace not only the face of an actor in a movie clip, but also the dialog. The methods and tools used to obtain the replacement of the dialogs in the audio media associated with the video clip comprising inserting, in the bottom of the screen 2, written indication of the dialog, can be implemented as in a conventional karaoke entertainment system.

According to the present invention, the digital video media, which is to be read by reader 8, contains not only the successive pictures of the clip, but also the transition vectors between the faces of a dedicated actor of that movie between the different pictures. Then, as it will be understood later, the central processing device 4 can superpose, to the video pictures, the face of the user U taken by camera 6 in the corresponding location, and orientation.

According to the present invention, the pre-processing of a movie clip comprises the following steps:
 isolating in the movie pictures the face of the actor which is dedicated to be replaced by an user in the entertainment system;
 calculating, for each successive picture, the transition (deformation, size, orientation, displacement) from the former picture in the form of transition vectors.

Such a technology is already known to be much faster than pixel based transformation methods and saves calculation.

Having completed the video clip for each successive picture, the clip and the transition vectors are stored into the digital video media. Alternatively, the central processing device 4 comprises automatic means to process a video clip in order to obtain the transition vectors. Then, a conventional digital video media containing a video clip can be introduced in the reader 8 and be processed by the device 4 which stores the results in a memory.

Once the video clip is ready for use in the system of the present invention, a user U can be placed in front of camera 6 in order to use the entertainment system. Of course, the system of the present invention, and more particularly the central processing device 4 and the TV set 1, comprises control panels or keyboards, not shown, to be used for controlling the system.

The first step to replace the face in the movie clip is to build a 3D-modelization of the face of the user. This step may take a relative long time with respect to the time interval between two video pictures, but can be done in a preparation phase and needs to be done only once per user. The 3D-model of the user can be stored in the central device or on a portable media like a CD-ROM, a floppy disk or the like to be read by that device.

According to a preferred embodiment, several pictures (for example three) of the user are taken from different angles in order to build the 3D-model.

Known picture processing methods which can be used to implement the present invention are described, for example, in the Book "Multimedia Image and Video Processing" by Ling Guan et al. (ISBN 0-8493-3492-6), for example in the part "Image Processing Technologies for Multimedia Processing" by N. Merodotou et al.

During the preparation phase, the movie clip is, for example, in a fixed condition (pause), displaying one picture of the beginning of the clip. The system replaces the face of the actor in that fixed picture with the face of the user in a best fit condition. For example, the user takes a pose corresponding to the picture displayed on the screen, and presses a dedicated key. The system then just adapts the size of the picture and knows the initial orientation. Alternatively, the determination of the best fit condition is made automatically on the basis of brightness variations of the picture to determine the respective location of the element of the face (mouth, eyes, hair, etc.) using a pre-recorded base of brightness models.

Having pressed a start key on the control panel of the central device (or through a remote control device), the movie clip starts going on with a real time replacement of the face of the actor by the face of the user U.

The time between two pictures in a video system is usually of 20 milliseconds. That time is used according to the present invention to calculate the transition vectors between the former picture and the current one of the user. On the movie clip side, that calculation has already been made in the pre-recording step of the movie clip.

According to the first embodiment of the present invention, no further picture is taken from the user after the beginning of the clip. The system uses automatically the built 3D-model to which it applies the transition vectors of the face of the actor in the clip, for calculating the right picture to replace the face of the actor. The replacement of the face in the video picture uses conventional techniques for cutting part of a digital picture and inserting other digital information corresponding to the desired picture part to be inserted.

According to the second embodiment of the present invention, the camera 6 transmits every 20 milliseconds a picture of the user to the central control device 4. With that picture, the central processing device evaluates the transitions of the face of the user from the preceding picture. Having calculated these transitions and knowing the transitions of the face of the actor in the video clip, the central device 4 then uses the 3D-model to modify the face of the user (size, orientation) to obtain a current picture of the user corrected in size and in orientation and to be included it in the movie clip in place of the actor to be imitated. However, in this embodiment, the system does not modify the face expression (form of the mouth, of the eyes, etc.) of the user, hut just replace them in the correct orientation and size depending on the orientation and size of the actor picture. In this embodiment, the transformation parameters are only used to modify the picture of the user in order to save calculation time.

According to this embodiment, the face of the user as displayed on the screen does not correspond exactly to the expressions of the actor in the clip, but to the expressions of the user in front of a camera. However, the orientation of the face is, if necessary, corrected to align with the face of the actor.

Using not only the current picture but also the 3D-model gives the advantage of fitting to the orientation of the real actor picture of the clip (alleviating, for example to superimpose a right profile of the face with a left profile of the body) even reproducing the face expression of the user playing the imitation.

As in a karaoke entertainment system, the user can also speak in accordance with the dialogs of the movie clip, and his voice is then reproduced on the speaker system (not shown) of the entertainment system.

An advantage to only use the transition vectors between two successive pictures of the user is that it gives enough time for a real time operation.

If necessary, one can also reduce the number of pictures of the user. Indeed, in a movie, only 25 pictures per second are necessary to give to a watcher the impression of fluent pictures. With the example of a video signal comprising 50 pictures per second, one can take only one picture every two video pictures.

Calculating a 3D-model of a face based on one or few pictures of that face and calculating transition vectors in order to minimize the number of information necessary to display a following picture is in the ability of one skilled in the art, using conventional picture processing systems and calculation methods.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

The invention claimed is:

1. A method for dynamically replacing in real time the face of an actor in a video clip, with the one of a user of an entertainment video system, comprising the steps of:
   in a preparation phase:
      taking at least one first fixed picture of the face of the user;
      building a 3D-model of that face;
      replacing a first video picture of the face of the actor with a reproduction of the face of the user after matching their respective size and orientation; and
   while the clip is going on:
      taking periodically a current picture of the face of the user;
      calculating current transformation vectors of the face of the user from a preceding picture of the face of the user to the current picture of the face of the user, using the 3D-model to determine said transformations; and
      dynamically replacing the face of the actor in successive pictures of the video clip every 20 milliseconds with successive pictures reproducing the face of the user by applying at least orientation, size and displacement vectors to the 3D-model of the face of the user on the basis of orientation, size and displacement vectors calculated for the face of the actor in the clip and applying to a preceding picture of the user inserted in the clip the current transformation vectors of the face of the user, such that expressions in the face of the user and transitions of the face of the actor in the successive pictures of the video clip are followed.

2. Entertainment system for playing the part of an actor in a movie clip comprising:
   a digital video reader (8);
   a video screen (2);
   a video camera (6) to take fixed pictures of an user;
   a processing device (4) for replacing the face of a dedicated actor of the movie clip with the face of the user according to the method of claim 1.

3. The method of claim 1, further comprising:
   calculating, based on the preceding picture of the face of the user and the current picture of the face of the user, expression transformation vectors for the 3D-model to reproduce a current expression of the user in the video clip.

4. The method of claim 3, where the expression transformation vectors comprise a shape-of-mouth transition vector.

5. The method of claim 3, where the expression transformation vectors comprise a position-of-eyes transition vector.

6. The method of claim 3, where replacing the face of the actor in successive pictures of the video clip with successive pictures reproducing the face of the user further comprises:
   applying the expression transformation vectors to the 3D-model to generate for the successive video pictures the current user expressions in the current picture of the face of the user.

7. The method of claim 1 wherein the taking at least one first fixed picture of the user further comprises taking a picture of the user taking a pose corresponding to the first video picture of the actor.

8. The method of claim 1 wherein the preparation phase further comprises taking at least two additional pictures of the user taken from different angles.

9. The method of claim 1 further comprising:
   replacing a voice of the actor with a voice of the user.

10. The method of claim 9 further comprising:
    inserting written indication of the dialog such that the user's voice is replaced dynamically.

11. The system of claim 2 further comprising:
    a microphone for replacing dialog of the actor in the movie clip with a voice of the user.

12. The system of claim 11 wherein the microphone is linked to the processing device (4).

* * * * *

UNITED STATES PATENT AND TRADEMARK OFFICE
CERTIFICATE OF CORRECTION

| | | |
|---|---|---|
| PATENT NO. | : 7,697,787 B2 | Page 1 of 1 |
| APPLICATION NO. | : 10/456765 | |
| DATED | : April 13, 2010 | |
| INVENTOR(S) | : Illsley | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1579 days.

Signed and Sealed this

Fourth Day of January, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,697,787 B2 | Page 1 of 1 |
| APPLICATION NO. | : 10/456765 | |
| DATED | : April 13, 2010 | |
| INVENTOR(S) | : Martin Illsley | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1579 days.

In the Specification

In column 4, line 54, after "etc.) of the user," replace "hut" with --but--.

Signed and Sealed this
Twenty-fifth Day of January, 2011

David J. Kappos
*Director of the United States Patent and Trademark Office*